(No Model.)
E. GRUENINGER.
PIPE JOINT.
No. 348,556. Patented Sept. 7, 1886.
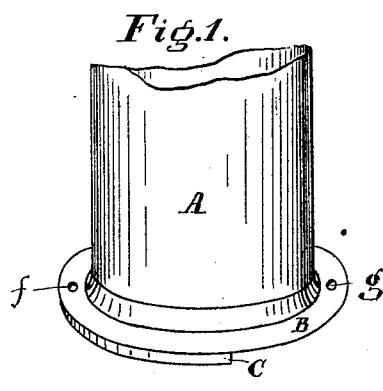
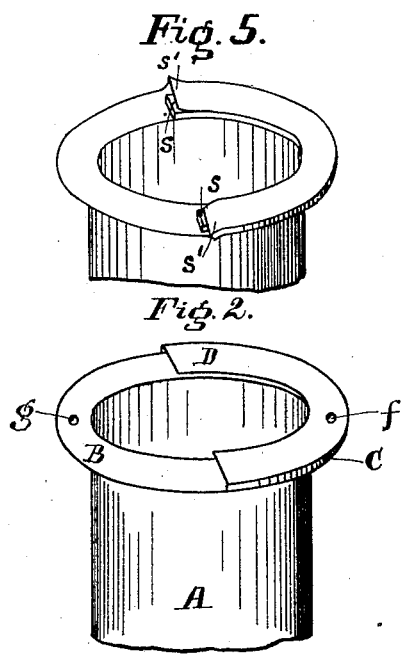
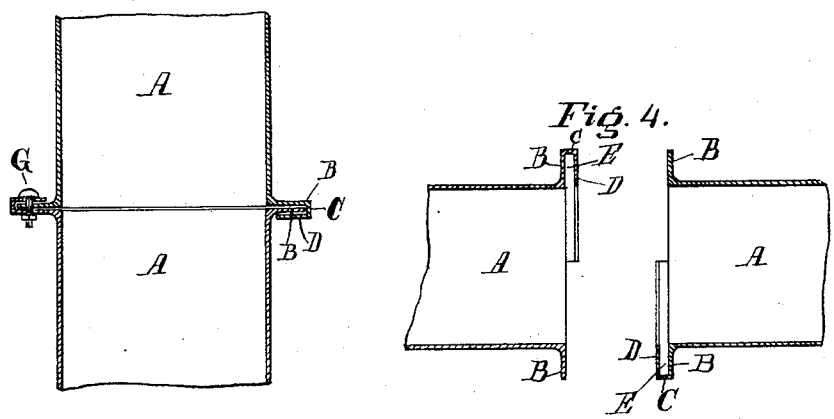
Attest
O. M. Hill
Jno. W. Prehli
Inventor
Edward Grueninger
per Wm. Hubbell Fisher
Att'y

UNITED STATES PATENT OFFICE.

EDWARD GRUENINGER, OF CINCINNATI, OHIO.

PIPE-JOINT.

SPECIFICATION forming part of Letters Patent No. 348,556, dated September 7, 1886.

Application filed March 8, 1886. Serial No. 194,366. (No model.)

*To all whom it may concern:*

Be it known that I, EDWARD GRUENINGER, a resident of Cincinnati, in the county of Hamilton and State of Ohio, have invented certain new and useful Improvements in Pipe-Joints, of which the following is a specification.

The object of my invention is to provide a pipe-joint which will permit the removal of any section without disturbing the remaining sections. The many advantages accruing from this function will be more fully set forth hereinafter.

In the accompanying drawings forming part of this specification, Figure 1 is a perspective view of a section of pipe showing one face of my improved joint. Fig. 2 is a perspective view of a section of pipe showing the other face of my improved joint. Fig. 3 is a central longitudinal section of two sections of pipe united by means of my improved joint. Fig 4 shows (separated) the sections of pipe illustrated in Fig. 3. Both ends of each section of pipe are alike, so that a description for one end applies also to the other.

A represents an ordinary section of pipe. At the end a flange, B, encircles the pipe at right angles to its axis. A web, C, is located at the edge of the flange B, and, extending half-way round, connects the flange B to the semicircular flange D. There is thus left between the flange B and the flange D a space, E. Two bolt-holes, $f$ and $g$, are placed in the flanges. The bolt-hole $f$ is preferably located in the center of the flange D, and extends also through the flange B, immediately beneath. The hole $g$ is placed in the center of that part of the flange B which is not covered by the flange D. The sections are joined by sliding them together laterally, so that the uncovered portion of flange B of each section fits in the space E of the other section. When so placed, the hole $g$ of the one section coincides with the hole $f$ of the other section. The sections may be secured in this position by a bolt or rivet, G, passed through one or the other of the openings formed by the holes $f$ and $g$. Two bolts may be employed, but one is sufficient.

The special use for which this pipe is adapted is in making waste ways for sawdust in woodworking establishments. In these establishments long lines of pipe are put up with short connections to each machine, and the sawdust is forced through by the aid of a blast.

In putting up such piping with the old method of joining sections, it is necessary to first carefully locate each machine, so as to know accurately the place where the short connecting-pipe is to enter the main line. Besides the time consumed in making these measurements, mistakes are not unusual. With my pipe the entire main line may be first put up without any reference to the machines, and when in place the particular section with which a given connection is to be made may be slipped out laterally from the pipe without disturbing the main line of pipe. After the connection has been made with the section it is slipped back into its place in the line without it being necessary to move the whole line.

Stove-pipe provided with my joint may be taken down, section at a time, and cleaned without difficulties attendant upon the old plan. Besides its use with thin pipes, the joint may be used with pipes of heavy metal for gas, water, or steam purposes. In such cases, and in others where a tight joint is necessary, a packing-gasket may be placed between the flanges. This modification is shown in Fig. 5, in which S represents the gasket. A similar gasket is placed in each section of pipe, so that when the sections are locked an air-tight joint is formed. When I use the gasket-packing, one of the flanges, D, and web C are preferably flared, as at S', in order to more easily receive the other section of pipe with its flange.

What I claim as new, and desire to secure by Letters Patent, is—

The combination of the pipes A, each provided with flange B, flange D, connecting-web C, holes $f$ and $g$, and bolt G, substantially as and for the purposes specified.

EDWARD GRUENINGER.

Witnesses:
JNO. W. STREHLI,
J. LEVIN.